US007074335B2

(12) United States Patent
Berg et al.

(10) Patent No.: US 7,074,335 B2
(45) Date of Patent: Jul. 11, 2006

(54) METHOD OF PRODUCING HIERARCHICAL POROUS BEADS

(75) Inventors: Hans Berg, Uppsala (SE); Mats Carlsson, Uppsala (SE); Anders Larsson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 216 days.

(21) Appl. No.: 10/500,677

(22) PCT Filed: Dec. 17, 2002

(86) PCT No.: PCT/SE02/02352

§ 371 (c)(1),
(2), (4) Date: Jun. 30, 2004

(87) PCT Pub. No.: WO03/055597

PCT Pub. Date: Jul. 10, 2003

(65) Prior Publication Data

US 2005/0077221 A1    Apr. 14, 2005

(30) Foreign Application Priority Data

Jan. 2, 2002    (SE) .................................. 0200010

(51) Int. Cl.
*B01D 15/08* (2006.01)
(52) U.S. Cl. .................. 210/656; 210/635; 210/198.2; 210/502.1; 521/61
(58) Field of Classification Search ................ 210/635, 210/656, 198.2, 502.1; 521/61, 82, 110, 521/112
See application file for complete search history.

(56) References Cited

U.S. PATENT DOCUMENTS

| 5,723,601 | A | * | 3/1998 | Larsson ...................... 536/103 |
| 5,863,957 | A | * | 1/1999 | Li et al. ...................... 521/61 |
| 6,281,257 | B1 | * | 8/2001 | Ma et al. ...................... 521/61 |
| 6,290,853 | B1 | * | 9/2001 | Allmer et al. ............... 210/635 |
| 6,451,348 | B1 | * | 9/2002 | Jeong et al. ................ 424/486 |
| 6,590,096 | B1 | * | 7/2003 | Berg et al. ................. 536/55.1 |
| 6,765,030 | B1 | * | 7/2004 | DeSimone et al. ........... 521/77 |
| 6,984,733 | B1 | * | 1/2006 | Berg et al. .................. 536/124 |
| 2004/0039193 | A1 | * | 2/2004 | Berg et al. .................. 536/123 |

FOREIGN PATENT DOCUMENTS

| EP | 631597 | * | 9/1993 |
| WO | WO 97/19347 | | 5/1997 |
| WO | WO 00/12618 | | 3/2000 |
| WO | WO 00/17257 | | 3/2000 |

* cited by examiner

*Primary Examiner*—Ernest G. Therkorn
(74) *Attorney, Agent, or Firm*—Yonggang Ji (57) ABSTRACT

The present invention is a method of producing porous beads, which comprises the steps of providing a first liquid phase comprising a bead matrix material and essentially edgy templating particle(s), said particle(s) being treated with a surface modifying agent; providing a second liquid phase which is immiscible with the first liquid phase; contacting the first phase and the second phase under conditions resulting in an emulsion of droplets comprised of the first liquid phase dispersed in the continuous second liquid phase; transforming the droplets to mesoporous beads by solidification of the liquid; and removing the templating particle(s) from the beads without causing any essential change of the surrounding bead, whereby hierarchical networks of pores are provided in the beads.

22 Claims, 7 Drawing Sheets

METHOD OF PRODUCING HIERARCHICAL POROUS BEADS

This application is a filing under 35 U.S.C. § 371 and claims priority to international patent application number PCT/SE02/02352 filed Dec. 17, 2002, published on Jul. 10, 2003 as WO 03/055597 and also claims priority to patent application Ser. No. 0200010-7 filed in Sweden on Jan. 2, 2002; the disclosures of which are incorporated herein by reference in their entireties.

TECHNICAL FIELD

The present invention relates to a method for the production of one or more porous beads for use e.g. in a chromatographic separation procedure. The beads produced by the method according to the invention exhibit improved properties due to a hierarchical pore structure.

BACKGROUND

A general problem in chromatography, adsorption processes, heterogeneous catalysis etc where porous particles are used, is that the mass transport rate is strongly dependent on the particle size. Rapid mass transport can be achieved by decreasing the particle size, but small particles will also increase the backpressure of the packed beds. Hence, a trade-off must be made between the mass transport rate and the pressure-flow properties. One way to improve the mass transport in a porous particle is to introduce a hierarchical pore structure, where large feeder pores from the particle surface open into a network of smaller pores with a large surface available for adsorption.

EP 0 222 718 (Mosbach and Nilsson) relates to particles that are used e.g. in chromatography or as microcarriers in the cultivation of anchorage dependent cells. EP 0 222 718 attempts to solve the mass transport problem by introducing cavities in the particles. More specifically, EP 0 222 718 discloses a method, wherein a cavity generating compound is added to an aqueous solution comprising a matrix material, emulsifier is added, particles are formed by dispersion and finally said cavity generating compound is washed out to leave behind cavities in the particles. An illustrative amount of cavity generating compound added is up to 10% by weight, corresponding to 3.6% by volume. This low amount of cavity-forming particles will not make contact with each other, resulting in a closed-cell porous structure as pointed out in EP 631 597. Accordingly, this is not a true hierarchical pore structure.

U.S. Pat. No. 5,739,021 (Katinger et al) discloses the formation of porous carriers suitable for cell culture. More specifically, such porous carriers are formed by mixing solid pore-forming agents into a polyolefin melt, which is then extruded into an aqueous phase through rotating knives to cut the extruded thread and form lenticular shaped particles. The pore-forming agents, which are normally water-soluble inorganic salts, are then removed by washing out according to conventional procedures. The melt formed as described above is of such an extreme viscosity, that extrusion technology must be used. However, such technology includes certain drawbacks, such as a practical limitation of the size of the particles formed. For example, in the field of chromatography, sizes of below about 200 μm diameter are usually desired. By extrusion, it is difficult to make particles within that size range.

M Zhang et al (M Zhang, Y Sun: J Chromatogr A 922, 77–86 (2001), Cooperation of solid granule and solvent as porogenic agents—Novel porogenic mode of biporous media for protein chromatography) teach a method wherein glycidyl methacrylate, divinylbenzene and triallylisocyanurate are bulk copolymerised in the presence of a cyclohexanol-dodecanol mixture as a porogen and sodium sulphate particles. The porogen and sodium sulphate are washed out and the polymer is crushed, resulting in particles of a hierarchical pore structure. One drawback with this technology is that it produces irregular particles, which are notoriously difficult to pack e.g. in a chromatographic column.

EP 0 631 597 (Larsson) describes preparation of agarose beads templated by oil droplets inside the agarose solution droplets, i.e. an oil-in-water-in-oil double emulsion system. One drawback of such a system is that the unstable nature thereof renders it very difficult to use in a production process. Another drawback is that due to a large volume fraction of superpores in the beads so produced, only low adsorption capacities are obtained when the beads are used in chromatography. Furthermore, said EP 0 631 597 is limited to agarose beads.

WO 0017257 (Berg et al) teaches an improvement over the above mentioned EP 0 631 597, wherein a polymeric water-in-oil emulsifier is used to make the double emulsion more stable and enable production on a larger scale. However, this technology will also exhibit the above mentioned problems related to the large volume fraction of superpores. In addition, this method is also limited to polysaccharides.

Accordingly, the various methods suggested in the prior art still suffer from essential drawbacks and limitations. Thus, there is still a need of improved methods for the production of porous beads.

SUMMARY OF THE INVENTION

One object of the present invention is to provide a porous bead for use e.g. in chromatographic separation procedures, which bead exhibits a pore structure that favours an improved mass transport in process chromatography media.

Another object of the invention is to provide a method of preparing such a bead. This can be achieved by the method of producing porous beads as defined in the appended claims. Other objects and advantages of the present invention will appear from the detailed description that follows.

BRIEF DESCRIPTION OF THE DRAWINGS

FIG. 2a shows a SEM picture of a bead from Example 2, while FIG. 2b shows a closer view of a SEM picture of a bead from Example 2.

FIG. 3a shows a SEM picture of a bead from Example 3, while FIG. 3b shows a SEM picture of a cut bead from Example 3.

FIG. 5a shows a SEM picture of a cut bead from Example 4, while FIG. 5b shows a SEM picture of a cut bead from Example 4.

FIG. 7a shows a light microscopy picture of beads from Example 7, while FIG. 7b shows light microscopy picture of beads from Example 7, after HF leaching.

DEFINITIONS

In the present specification, the term "templating" means the solidification of a fluid in the presence of solid features, whereupon the removal of said solid features a corresponding cavity is formed.

The term "hierarchical" is used to describe a porous structure with large pores open to the exterior. On the walls of these large pores, a system of smaller pores opens. Optionally, a further system of even smaller pores may open on the walls of these pores etc. A hierarchical pore structure may also have a fractal character, in which case the larger pores continuously divide into smaller pores.

The term "bimodal" means a pore structure with two distinct classes of pore sizes. These may or may not be connected in a hierarchical structure.

The term "percolation" means the point where the particles/droplets/cavities in a disperse phase have a sufficient number of contact points to create a continuous network.

According to the IUPAC definition, "micropores" are of a diameter<2 nm, "mesopores" have a diameter within the interval of 2–50 nm and "macropores" are of a diameter>50 nm.

DETAILED DESCRIPTION OF THE INVENTION

A first aspect of the present invention is a method of producing at least one porous bead, which comprises the steps of
(a) Providing a first liquid phase comprising a bead matrix material and at least one essentially edgy templating particle, said particle(s) being treated with a surface modifying agent;
(b) Providing a second liquid phase which is immiscible with the first liquid phase;
(c) Contacting the first phase and the second phase under conditions resulting in an emulsion of droplets comprised of the first liquid phase in a continuous second liquid phase;
(d) Transforming the droplets to mesoporous beads by solidification of the liquid in said droplets; and
(e) Removing the templating particle(s) from the beads without causing any essential change of the surrounding bead, whereby the mesoporous beads resulting from step (d) are supplemented with one or more larger pores corresponding to the cavities left by the removed templating particle(s);

whereby a hierarchical network of pores is provided in each bead. Thus, the network will be comprised of larger channels resulting from the templating particles connected to the mesopores formed in the bead matrix during solidification. In the present context, "without causing any essential change of the surrounding bead" is understood to mean no essential conformational or chemical change of the bead resulting from step (d).

As the skilled person will realise, the second liquid phase will comprise an emulsifier, many of which are well-known and commercially available. The second liquid phase can optionally also comprise any additives, such as salt, inhibitors of emulsion polymerisation, thickeners etc. The emulsification according to step (c) above can be performed simply by stirring, or by any suitable equipment, such as static mixers, membrane emulsification equipment, nozzles, colloid mills etc.

Accordingly, the present method provides porous beads of a bimodal, hierarchical pore structure, with smaller pores resulting from step (c), usually the size of the type conventionally denoted mesopores, which smaller pores are connected to the larger cavities or channels formed when the templating particle is removed. The last mentioned cavities or channels are sometimes for reasons of simplicity referred to herein as "superpores", and are usually in a size range of between about 500 nm and about 50 µm. The conventional mesopores are for the same reason sometimes denoted "small pores", even though the term "small pores" as used herein may also include micropores and macropores. Accordingly, the small pores may in the present context be of sizes of up to about 2 µm.

As the skilled in this field will realise, in order to keep the templating particles specifically in the droplet phase, their surface properties in terms of hydrophilicity/hydrophobicity should be controlled in an appropriate way, so that they are preferably wetted by the droplet phase only. Accordingly, in an advantageous embodiment of the present method, the templating particles are treated with a surface modifying agent before or during addition thereof to the droplet phase. The term "treated" is understood to mean herein that the surface modifying agent will react with or adsorb to the particle surface to a sufficient extent to provide the desirable surface characteristics. Thus, if the emulsion provided in step (a) is an oil-in-water emulsion, then the surface modifying agent is a hydrophobic agent, such as a fatty acid, a fatty amine, a hydrophobic silane, etc. In functional terms, said agent can be any molecule with one or more hydrophobic regions and one or more functional groups that is capable of reacting with or physically adsorb to the particle surface in such a fashion that the hydrophobic regions point outwards. Accordingly, a suitable agent is easily selected by the skilled in this field, since a large number of such agents are commercially available today.

In the alternative case, if the emulsion provided in step (a) is a water-in-oil emulsion, then the surface modifying agent is a hydrophilic agent, such as a polysaccharide, a polyelectrolyte, a polyhydroxyfunctional polymer or some form of block/graft copolymer with hydrophilic character and functional groups capable of reacting with or adsorbing to the particle surface. Like above, the suitable agent for each case is easily selected by the skilled person.

However, the emulsion provided in step (a) can in a further alternative be an oil-in-oil emulsion, in which case a more specific surface modifying agent is needed. In this case it should again have functional groups capable of reacting with or adsorbing to the particle surface. It should also contain domains with affinity to the continuous oil phase, e g perfluorinated groups in the case of a perfluorinated oil, silicone segments in the case of a silicone oil, polycarboxylic acids, polyphenols etc in the case of a polyethylene glycol oil. Thus, depending on the nature of the non-spherical templating particles and the oil, the skilled person can easily make a suitable selection of agent.

If the beads produced according to the present method are to be used as a separation matrix e.g. in chromatography, then a critical factor for the mass transport performance thereof will be the connectivity of the large-pore network. At low concentrations of particles, the cavities will be placed at a distance from each other and only connected by the small pores. When the particle concentration increases, the number of particle-particle contacts will be larger and at a critical concentration, which is herein denoted the percolation threshold, a continuous network of particles will be formed. Thus, such beads will present a continuous pore system.

However, when the percolation threshold is reached in a particle dispersion, the viscosity will increase dramatically, giving a transition from the preferred fluid state to a dough-like consistency. Accordingly, special considerations may be needed for emulsification of droplets with a sufficiently high particle concentration in order to ensure that a continuous pore system is formed in the beads produced.

One way to assess the percolation threshold is to measure the sediment volume of the surface treated particles in the droplet phase used. In a sediment, the particles are contacting each other and have hence reached the percolation threshold. It can also be determined by known Theological methods, e g by plotting the viscosity against the volume fraction of particles and extrapolating the volume fraction where the viscosity reaches infinity by some form of semiempirical equation, e g the Krieger-Dougherty equation. A simplified variety of this method is the determination of the oil absorption number, common in the filler industry, where an oil is added to a weighed amount of powder and the oil amount needed to reach a paste-like consistency is recorded.

Thus, the difficulty described above can be circumvented by adding particles to a level well below the percolation threshold, emulsifying the droplet phase and then removing liquid from the droplet phase by e g distillation, changing the continuous phase composition to extract the liquid etc. The particle concentration in the preformed droplets then goes above the percolation threshold, but the high viscosity will be acceptable, as the droplets only have to be solidified. Accordingly, one embodiment of the present comprises a step of removing liquid from the droplet phase after step (c) but before step (d).

In a specific embodiment, in order to improve the embodiment outlined above, the present method also comprises a step of diluting the droplet phase with a volatile material before step (c). Suitable diluents will be of hydrophilic or hydrophobic character, depending on the nature of the droplet phase, and can for example be lower hydrocarbons, halogenated hydrocarbons, ethers, esters, ketones etc in the hydrophobic case and water, lower alcohols etc in the hydrophilic case.

The above discussed difficulties encountered with high viscosity droplets can alternatively be handled by keeping the particle concentration slightly below the percolation threshold in monomer droplets. During solidification of the droplets it appears that the particles flocculate into a network structure, effectively lowering the amount of particles needed to reach the percolation threshold. This has been illustrated by the present invention as shown in Examples 2 and 3, FIGS. 2 and 3 in styrene-divinylbenzene droplets. The flocculation is indicated by the formation of ellipsoidal beads (due to the dramatic viscosity increase) at high stirring rates during polymerisation, as well as by electron micrographs indicating a continuous superpore network in the beads. Thus, in another embodiment of the present method, the concentration of the templating particle in the droplet phase is kept below or up to the percolation threshold until the solidification. As the skilled person in this field will realise, the percolation threshold will be very dependent on particle shape and on any tendency to aggregation. Accordingly, the percolation threshold can vary from a few percent by volume to about 80% by volume. The possibility to make ellipsoidal beads is a particular advantage, as the ellipsoidal shape gives a shorter average mass transport path than the normal spherical shape for a given bead volume. Hence it will be possible to further improve the mass transport rate without sacrificing the pressure-flow properties of the packed bed. Accordingly, in a specific embodiment, the present invention is a method for the production of one or more ellipsoidal beads having the herein described hierarchical pore structure.

The shape of the template particles has also shown to be of great importance. In the prior art, rounded such as essentially spherical particles have been used as templates in similar procedures. However, spherical particles will give a much higher percolation threshold, often in the range of 60–75 vol %, than a particle of a corresponding volume but of a more elongate shape. For example, the above discussed EP 0 222 718 teaches the use of calcium carbonate, which is normally available as in principle rounded particles, as template particles. These rounded particles are used in concentrations up to 10 wt % (corresponding to 3.6 vol %), which is far below the percolation threshold, resulting in a closed cavity structure. If the concentration of these particles were to be increased to the percolation threshold, typically in the range of 50–60 vol % for standard calcium carbonates, in order to obtain a connected superpore structure, a large proportion of the bead volume would be occupied by the superpore system. This is not desirable, as the adsorption capacity of the bead is mainly dependent on the amount of surface present in the small-pore system.

The present invention has now shown that a well connected superpore system that occupies only a minor part of the bead volume can be obtained if non-spherical, such as plate-like, rod-like or irregularly edgy particles, such as star-like or generally fluffy structures, are used as templates. Such particles have in many cases dramatically lower percolation thresholds than spherical ones. Accordingly, one embodiment of the present method utilises templating particles, the shape of which is edgy and essentially elongated. In this context, the term "edgy" means particles with protruding parts. The "edgy" character may be defined (H Wadell: J Geol 40, 443 (1932)) by the sphericity $\Psi$, where $\Psi$=(surface area of sphere having same area as particle)/(surface area of particle). A sphere will have a sphericity of 1 and any "edgy" particle will have a sphericity of <1. A cube will for example have a sphericity of 0.806. In the present invention, the template particles should have a sphericity of below about 0.8, preferably below about 0.6. An alternative measure of the "edgy" character, more suitable for determinations by image analysis of microscopy projections is the circularity, defined as (perimeter of circle of same area as particle projection)/(perimeter of particle projection). In this case a projected square will have a circularity of 0.886. A suitable circularity according to the invention is below about 0.85, preferably below about 0.6.

Edgy templating particles can be obtained by using commercially available fibrous, rod-like, plate-like etc particulate materials. This type of materials has e.g. previously been used as reinforcing fillers in e g plastics. They can alternatively be prepared by crushing or grinding coarser particulate materials or by precipitating particles under conditions leading to edgy particles, e g as acicular or star-like crystals. It is also possible to achieve the desired edgy structure by flocculating/assembling smaller particles to more or less fluffy aggregates, as seen e.g. in the structures of pyrogenic silica or carbon black particles. Further, edgy particles may be obtained from biological sources, such as e g the shells of diatoms, radiolarians, foraminifera etc, either in entire or crushed form.

Accordingly, the present particle is of a shape that facilitates packing into low-density networks with many particle-particle contacts, and especially more such contacts than the packing of corresponding spherical particles would provide.

In one embodiment, the shape of the elongated particle is defined by an aspect ratio (length/width ratio) higher than two, preferably higher than five. In an advantageous embodiment, the longest dimension of the particles exceeds the diameter of the droplet, thereby enabling each particle to form a channel that contacts two essentially opposite ends thereof. After solidification and removal of the particle, this embodiment results in a bead wherein a flow through channel is formed i.e. allowing a liquid flow across the bead.

A specific embodiment utilises essentially fibrous particles, where it has been observed that beads can be prepared with one single fibre penetrating the entire bead, giving a cylindrical channel through the centre of the bead after leaching. This channel only represents 1–2% of the bead volume, since for example the volume of a 10 micron cylindrical channel through a 100 micron sphere will be 1.5% of the sphere volume, calculated by dividing the volume of a 10×100 micron cylinder with the volume of a 100 micron sphere.

Further, the nature of the above mentioned surface modifying agent is essential for the connectivity of the hierarchical pore structure achieved. The polarity of the particle surfaces should be suitably matched with the monomer/porogen system in order to obtain an open connection between the templated superpores and the mesopores. If the polarity is not well matched (e g if the particle surfaces have a too low polarity in the case of styrene-divinylbenzene monomers and an alcohol porogen), a skin with low porosity will form around the cavities, effectively cutting off the connection between the superpores and the mesopores. Naturally, a good match can be decided either by experience or by test experiments, the results of which is evaluated and optionally changes are made. However, a more scientific decision can also be made. Thus, a polished flat surface of the template particle material, or of a closely resembling material, is treated with the surface modifying agent. The polarity of the treated surface is then determined by contact angle measurements for a series of liquids according to W S Zisman: Adv Chem Ser 43, 1–51 (1964). From the contact angle data, a critical surface tension can be determined, which is a measure of the surface polarity. To avoid skin formation with a particular surface modifying agent, it is expected that the critical surface tension should not be lower than 20 mN/m, preferably not lower than 30 mN/m.

It is also desired that template particles protrude to a substantial extent through the droplet surfaces into the continuous phase. This is in order to avoid formation of a skin without superpores surrounding the droplets, which would prevent formation of a useful hierarchical pore structure. In order to make the particles protrude, they should be moderately hydrophobic (o/w system) or moderately hydrophilic (w/o system) respectively. The term "moderately" is understood to depend on the nature of the surface-modifying agent in combination with the emulsifier, which may adsorb on the outer particles and modify their character. It is also possible to use somewhat amphiphilic particles, prepared e g by slight grinding after the surface modification to expose some non-modified particle surface. It also appears that the protrusion tendency is stronger for particles with a high aspect ratio, as e g for fibrous particles. In a specific embodiment, a small amount of particles with different surface characteristics and/or shape is added in order to enable for these particles to specifically enrich in the droplet surfaces and create larger channels into the pore structure.

Again, the wetting properties of the particle surfaces can be assessed by contact angle measurements on a modified planar model surface. A droplet of the droplet phase liquid is placed on the surface, immersed in the continuous phase. A three-phase contact angle value of 90° will then indicate that particles at the emulsion droplet surfaces will be situated in the centre of the interface. At lower contact angles, the particles will be situated further towards the droplet side of the interface and at higher contact angles they will be placed further towards the continuous phase side. Ideally, the contact angle should be slightly below 90°, e g between 60° and 90°.

The above described templating particles can be removed from the solidified beads by use of conventional leaching methods, depending on the nature of the bead matrix and the particle itself. Naturally, the leaching agent should be selected in order not to have any negative impact on the properties of the bead, while at the same time it must be sufficiently aggressive for an efficient removal. The particles used must be insoluble in both the droplet and continuous phases of the emulsion. Their removal after solidification of the beads can in one embodiment be performed by chemical etching. This can be done with acids in general, e g acetic acid, hydrochloric acid, nitric acid etc, in one embodiment, wherein the particles are acid-soluble, e g carbonate minerals, oxide minerals, calcium phosphate, magnesium hydroxide, metal particles etc.

In another embodiment, the etching is performed by addition of fluorine compounds, e.g. hydrofluoric acid, ammonium bifluoride etc, which is suitable in the case of siliceous particles, e.g. silica, diatomite, glass, silicate mineral particles. In yet another embodiment, the etching is made by addition of one or more bases, e g sodium or potassium hydroxide, which is suitable in the case of alkali-soluble particles, e g silica or aluminium particles. It is also possible to etch with complexing agents such as EDTA in the case of particles from sparingly soluble metal salts, e g calcium sulphate.

In another embodiment, organic template particles may be used. These can be removed by solvents that do not dissolve the matrix material or in the case of inorganic matrix materials they may be removed by calcination. Examples of solvent-removable particles could be various polymeric fibres, and any organic crystals that do not dissolve in the emulsion phases used. These particles can also be removed by calcination, which is also the case for carbon fibres and other types of particulate carbon.

As mentioned above, in one embodiment of the present method, the templating particles are surface treated before addition thereof to the first liquid phase. Such pre-treated particles can be prepared as a step preceding step (a). Alternatively, pre-treated particles for use as templates are obtained from commercial sources.

For example, carbonate minerals, magnesium hydroxide, wollastonite and glass fibre are commercially available materials with hydrophobic surface modifications, which facilitates dispersion thereof in plastic melts. Such pre-treated particles have previously been used as fillers in plastics.

As mentioned above, the emulsion used in the present method can be either one of an oil-in-water emulsion, a water-in-oil emulsion, an oil-in-oil emulsion or an aqueous two-phase system. Accordingly, depending on the nature of the bead matrix used, a suitable solvent system is chosen and the different parameters can easily be selected by the skilled person in this field. Methods of preparing beads from these kind of emulsions are well known, and various hand-books and literature describe the general principles and considerations needed. In this context, see e.g. "Styrene based polymer supports developed by suspension polymerization"

(R Arshady: Chimica e L'Industria 70(9), 70–75 (1988)), "Polymer resins—Synthesis and structure" (D C Sherrington: Progr in Ion Exchange—Proc Ion-Ex 95 conf. Eds A Dyer, M J Hudson, P A Williams, Royal Soc Chem 1997, p 3–15), "Preparation of beaded organic polymers and their applications in size exclusion chromatography" (M J Lu: Column Handbook for Size Exclusion Chromatography, Academic Press 1999, p 3–26).

Accordingly, in an illustrative embodiment of the method according to the invention, the droplet phase of the emulsion is comprised of oil droplets. Such oil droplets can e.g. comprise polymerisable monomers as a bead matrix, such as styrene derivatives, acrylamides, acrylate esters, methacrylate esters, vinyl esters, vinyl amides etc. Thus, the transformation according to step (c) is provided by polymerisation in the presence of a porogen to provide a suitable content of micropores in the matrix. Furthermore, a suitable cross-linker is also present, as well as a polymerisation initiator. A large number of conventionally used and well known cross-linkers, initiators and porogens are available. Thus, the skilled person in this field can easily select the suitable conditions for each desired case. Depending on the nature of the polymer used, a cross-linking monomer is normally also introduced in this step. Typical cross-linking monomers can be divinylbenzene, di- or polyfunctional (meth)acrylate esters, di- or polyfunctional (meth)acrylamides, triallylisocyanurate, divinylamides etc.

In another illustrative embodiment of the present method, the droplet phase of the emulsion is comprised of aqueous droplets. Such aqueous droplets can e.g. comprise a natural polymer, such as agarose, alginate, carrageenan, gelatin etc. Such natural polymers are known to form physically cross-linked networks spontaneously on cooling or on addition of divalent metal ions, and accordingly the transformation according to step (d) is provided by physical gelation, preferably by lowering the temperature. The aqueous droplets can also contain polymerisable water-soluble monomers such as (meth)acrylamides, hydroxyfunctional (meth)acrylates, vinyl amides, allyl or styryl ethers of polysaccharides etc. In this case, the solidification will be caused by polymerisation similar to the oil-in-water embodiment.

In yet another illustrative embodiment, the present method uses aqueous droplets that comprise precursors of an inorganic compound, such as silica, titania, zirconia etc, and the transformation according to step (d) is then provided by sol-gel precipitation. Sol-gel processes are well described in the literature, e g in K Ishizaki et al: Porous Materials, Dordrecht 1998.

A second aspect of the present invention is a separation matrix comprised of porous beads produced according to the method described above, wherein each bead comprises a network of hierarchical pore sizes.

DETAILED DESCRIPTION OF THE DRAWINGS

Figure 1:
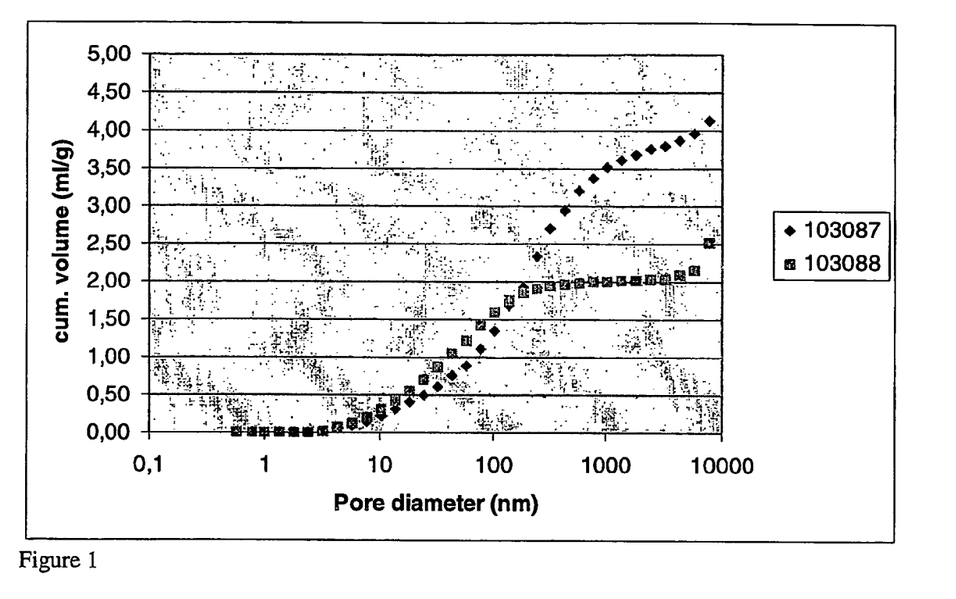
FIG. 1 shows mercury porosimetry data for beads from Example 1 (103088) and Example 2 (103087).
Figure 2:
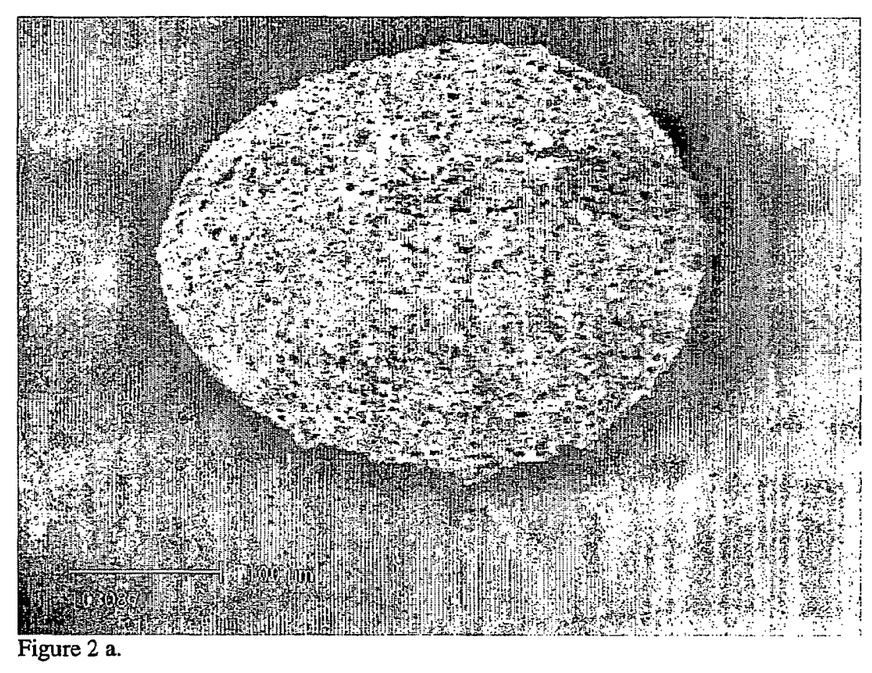
Figure 3:
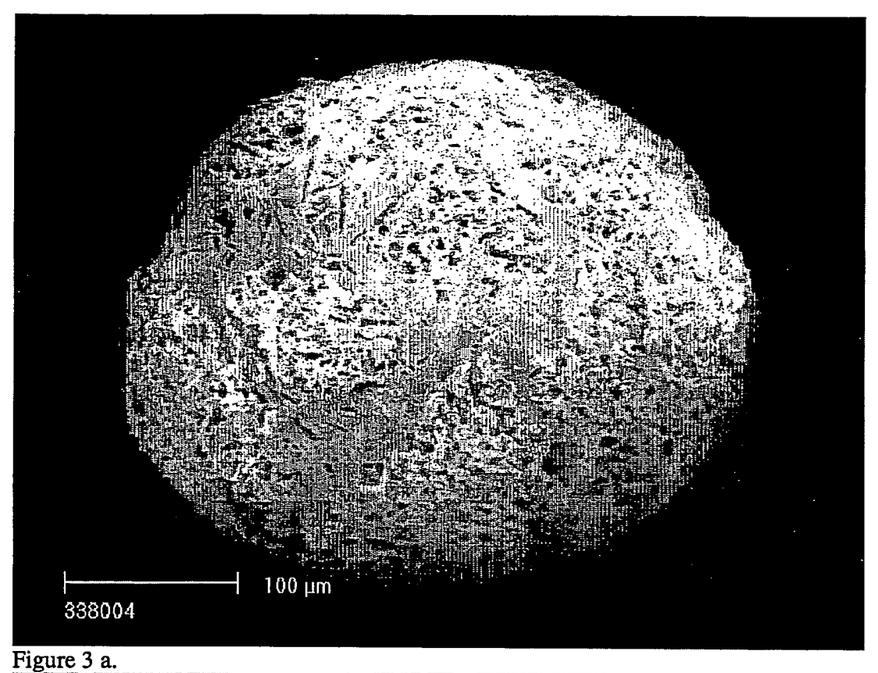

FIG. 1 shows the comparative mercury porosimetry (cumulative pore volume versus pore diameter) data for beads from Example 1 (103088), which is non-hierarchical poly-divinylbenzene beads, and Example 2 (103087), which is hierarchical poly-divinylbenzene beads produced according to the present invention.

Any porosity above 8 000 nm can be regarded as interstices between beads. The beads in Example 1 show porosity in the 10–200 nm interval, while the beads from Example 2 also have superpores in the 200–5000 nm interval.

FIG. 2a shows a SEM picture of a bead from Example 2, which shows that the superpore structure is open to the exterior and well connected. FIG. 2b shows a closer view of a SEM picture of a bead from Example 2, showing the connectivity of the pore structure.

FIG. 3a shows a SEM picture of a bead from Example 3. In these beads the template particles have partially segregated during the flocculation and produced concentrated and less concentrated regions. In the concentrated regions, the superpores have a good connectivity. FIG. 3b shows a close view SEM picture of a cut bead from Example 3. In the left part, the high concentration of template rod-like particles has given a well connected network and contact with the small pore structure on the pore walls. In the right part, the lower concentration of template rods has produced only a few cavities in the small-pore structure.

Figure 4:
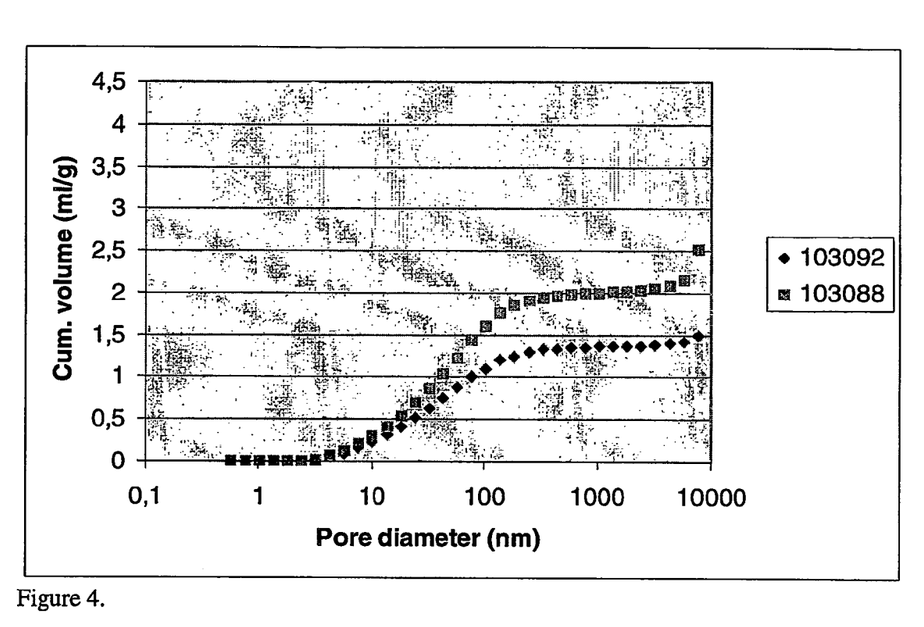
FIG. 4 shows mercury porosimetry data for beads from Example 1 (103088) and Example 4 (103092).

FIG. 4 shows mercury porosimetry data for beads from Example 1 (103088), which is non-hierarchical poly-divinylbenzene beads, and Example 4 (103092), illustrating skin effects from a too hydrophobic template particle surface. No superpore porosity is seen in the beads from Example 4, although the cavities show up in the SEM pictures below. In addition, the accessible volume of the small pores has decreased compared to the control beads, indicating hindrance by skin structures.

Figure 5:
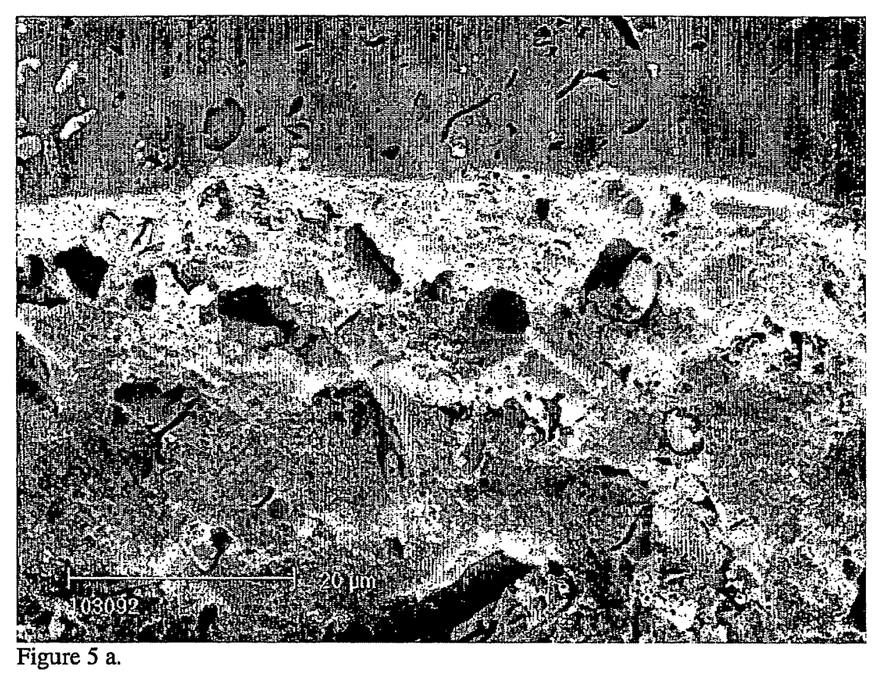

FIG. 5a shows a SEM picture of a cut bead from Example 4. Part of the outer bead surface is shown in the top of the picture and shows that the beads had an outer skin only partially penetrated by cavities from particles protruding very little through the surface. FIG. 5b shows a SEM picture of a cut bead from Example 4. The skin structure around the superpore cavities are clearly seen, penetrated by a few pores.

Figure 6:
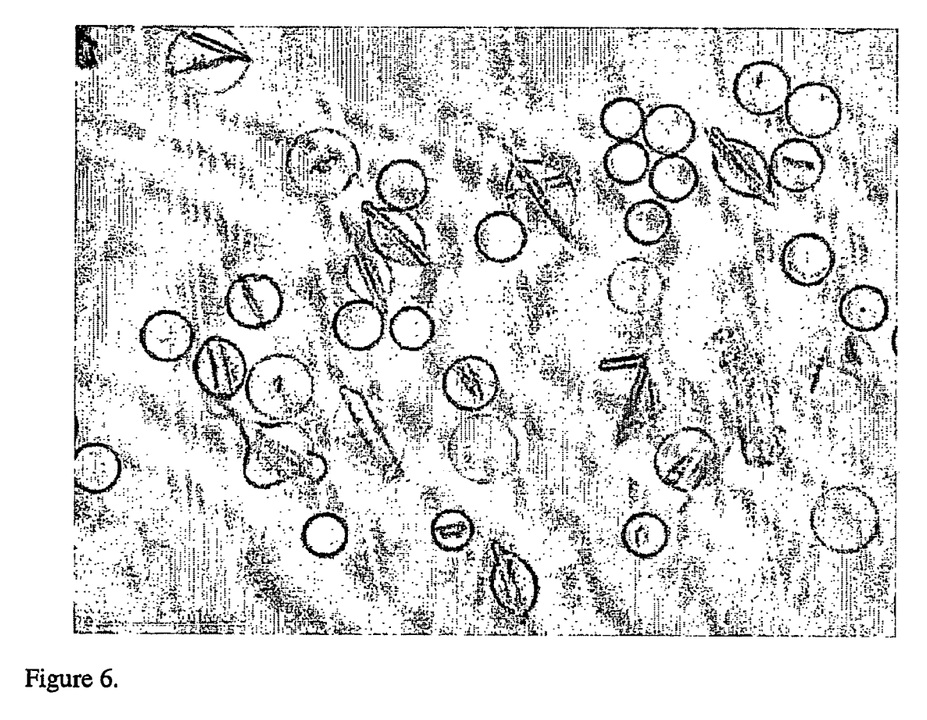
FIG. 6 shows a light microscopy picture of beads from Example 6.

FIG. 6 shows a light microscopy picture of beads from Example 6. Both beads that are penetrated by a single fibre and those that have included a pack of a few fibres appear clearly.

Figure 7:
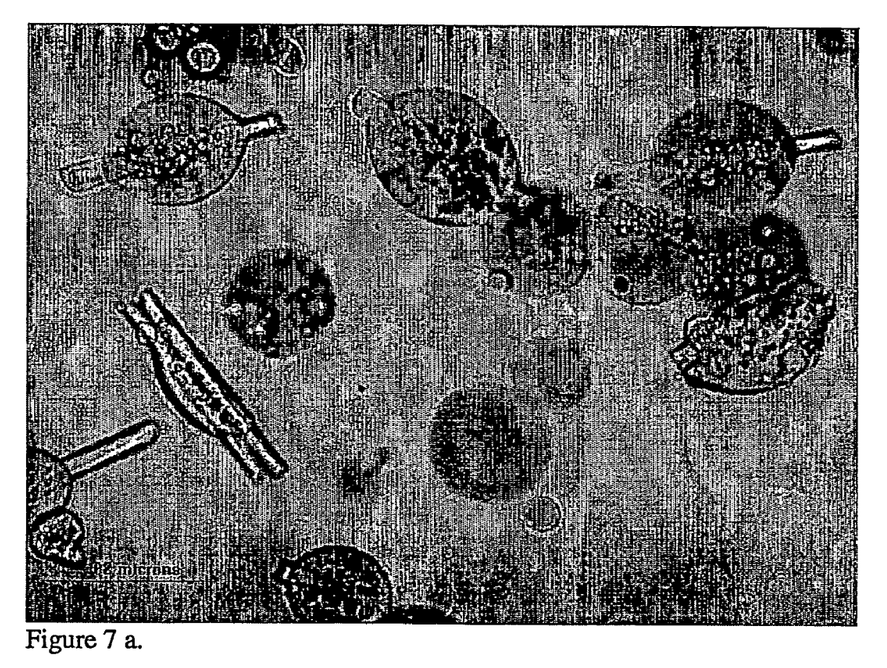

FIG. 7a shows a light microscopy picture of beads from Example 7. Here it is clear how fibres extends through the walls of the beads, thereby generating cavities that are later useful as flow through channels in chromatography. FIG. 7b shows light microscopy picture of beads from Example 7, after HF leaching.

Picture taken in mixed transmitted/reflected light to show opalescence from the small pore structure. Cylindrical channels penetrating straight through the beads appear clearly.

EXPERIMENTAL PART

The present examples are presented herein for illustrative purposes only and should not be construed as limiting the scope of the present invention as defined by the appended claims. All references given below and elsewhere in the present application are hereby included by reference.

The volume fraction of particles in sediments has been determined for the utilised particles in three different setups: From pure water, from water with a dispersant added and from toluene with a dispersant added. The data given in the table below indicate that all the used particles have low percolation thresholds due to their non-spherical shape.

| Particles | Vol. % in sediment Water | Vol. % in sediment Water + dispersant* | Vol. % in sediment Toluene + dispersant |
|---|---|---|---|
| Magnesium hydroxide | 19 | 23 | 31*** |
| Wollastonite | 20 | 23 | 20** |
| Diatomite | 21 | | 15** |

-continued

| Particles | Vol. % in sediment Water | Vol. % in sediment Water + dispersant* | Vol. % in sediment Toluene + dispersant |
|---|---|---|---|
| Tricalcium phosphate | 14 | 15 | |
| Calcium carbonate needles | 9 | 19 | |

*Dispex N40 (a polycarboxylate from Allied Colloids Ltd)
**Dimethyldichlorosilane
***Oleic acid Example 1

Comparative Example of Non-hierarchical Poly-divinylbenzene Beads

A solution was prepared of 20 ml 63% divinylbenzene, 20 ml 2-ethylhexanol, 0.4 g azobisdimethylvaleronitrile (initiator V-65 from Wako Pure Chemicals Co Ltd, Japan) and 0.4 ml oleic acid. In a 250 ml three-necked flask, 150 ml 2.5% aqueous polyvinyl alcohol (Mowiol 40–88 from Clariant) solution was mixed with 10 ml of a 0.25 mol/l potassium dichromate solution and heated to 70° C. Under 300 rpm stirring with a two-blade swing-out impeller, the monomer solution was slowly poured into the aqueous phase. The emulsion was allowed to polymerise for 2 h at 70° C. and 300 rpm stirring. The spherical polymerised beads were recovered by sieving between 500 and 40 microns and were then washed with water and acetone. By mercury intrusion porosimetry (FIG. 1) they were shown to have a monomodal pore size distribution in the 10–100 nm range.

Example 2

Producing Poly-divinylbenzene Hierarchical Beads from Plate-formed Template Particles Treated with a Hydrophobic Agent A solution was prepared of 20 ml 63% divinylbenzene, 20 ml 2-ethylhexanol, 0.4 g azobisdimethylvaleronitrile (initiator V-65 from Wako Pure Chemicals Co Ltd, Japan) and 0.4 ml oleic acid. Into this solution was mixed 50 g magnesium hydroxide (Fluka—brucite particles with a hexagonal plate-like shape) and the resulting dispersion was deflocculated by treatment with an ultrasonic probe. In a 250 ml three-necked flask, 150 ml 2.5% aqueous polyvinyl alcohol (Mowiol 40–88 from Clariant) solution was mixed with 10 ml of a 0.25 mol/l potassium dichromate solution and heated to 70° C. Under 450 rpm stirring with a two-blade swing-out impeller, the monomer/magnesium hydroxide dispersion was slowly poured into the aqueous phase. The stirring rate was decreased to 400 rpm and the emulsion was allowed to polymerise for 2 h at 70° C. The ellipsoidal polymerised beads were recovered by sieving between 500 and 40 microns and were then washed with water and acetone. Glacial acetic acid was added to dissolve the magnesium hydroxide over night and the beads were then washed with water. A determination of the ash content indicated that essentially all of the magnesium hydroxide had been leached out. By mercury intrusion porosimetry (FIG. 1) it was shown that these beads had an accessible superpore structure in addition to the small pore structure induced by the ethylhexanol porogen. This is an indication of a hierarchical pore structure. The SEM pictures (FIG. 2a and b), show that the superpore structure is open to the exterior and well connected. Without the presence of the oleic acid, essentially all of the magnesium hydroxide would transfer to the aqueous phase.

Example 3

Producing Poly-divinylbenzene Hierarchical Beads from Rod-like Template Particles Treated with a Hydrophobic Agent A solution was prepared of 20 ml 63% divinylbenzene, 10 ml toluene, 0.4 g azobisdimethylvaleronitrile and 0.4 ml dimethyldichlorosilane. Into this solution was mixed 20 g (17 vol %) wollastonite (Wicroll 10 from Partek Nordkalk Corp, Finland)—i.e. rod-like calcium silicate particles with aspect ratio 8:1 and average particle size 4.5 microns). After 10 min, 10 ml 2-ethylhexanol was added and the resulting dispersion was deflocculated by treatment with an ultrasonic probe. In a 250 ml three-necked flask, 150 ml 2.5% aqueous polyvinyl alcohol (Mowiol 4088 from Clariant) solution was mixed with 10 ml of a 0.25 mol/l potassium dichromate solution. Under 550 rpm stirring with a two-blade swing-out impeller, the monomer/wollastonite dispersion was slowly poured into the aqueous phase. The stirring rate was decreased to 300 rpm and the emulsion was allowed to polymerise for 2 h at 70° C. The spherical-ellipsoidal polymerised beads were recovered by sieving between 500 and 40 microns and were then washed with water and acetone. They were then treated first with concentrated hydrochloric acid and then overnight with hydrofluoric acid to dissolve the wollastonite. An ash content determination indicated that essentially all the wollastonite had been leached out. SEM pictures (FIGS. 3a and b) show a superpore structure open to the exterior and with a well connected structure. Due to aggregation of the rods, part of the cut bead exhibits only the small pore structure derived from the toluene/ethylhexanol porogen. Without the silane treatment, essentially all of the wollastonite would transfer to the aqueous phase.

Example 4

Skin Effects from a Template Particle Surface of an Undesirably High Hydrophobicity A solution was prepared of 20 ml 63% divinylbenzene and 0.4 g azobisdimethylvaleronitrile. 10 g (10 vol %) diatomite (Merck Eurolab) was mixed into the solution and 0.4 ml dimethyldichlorosilane was added. After 10 min, 20 ml 2-ethylhexanol was added. In a 250 ml three-necked flask, 150 ml 2.5% aqueous polyvinyl alcohol (Mowiol 40–88 from Clariant) solution was mixed with 10 ml of a 0.25 mol/l potassium dichromate solution and heated to 70° C. Under 400 rpm stirring with a two-blade swing-out impeller, the monomer/wollastonite dispersion was slowly poured into the aqueous phase. The stirring rate was decreased to 300 rpm and the emulsion was allowed to polymerise at 70° C. After 40 min, 5 g sodium acetate dissolved in 25 ml water was added. After another 80 min, the spherical-ellipsoidal polymerised beads were recovered by sieving between 500 and 40 microns and they were then washed with water and acetone. They were treated with hydrofluoric acid over night and washed with water. From a determination of the ash content, it was determined that essentially all the diatomite had been leached out. The mercury intrusion porosimetry data (FIG. 4) did not indicate any accessible superpores and the accessible volume of the porogen-induced small pores was considerably lower than in the control beads without template particles. The SEM pictures (FIGS. 5a and b) showed that the beads had an outer skin only partially penetrated by cavities from particles protruding very little through the surface. There was also a skin formed around the internal cavities from the leached out diatomite particles.

Example 5

Increasing the Particle Concentration by Evaporation 3 g agarose is dissolved in 100 ml boiling water and 20 g tricalcium phosphate is mixed into the solution. 0.1 ml Dispex N40 (a polycarboxylate dispersant from Allied Colloids Ltd) is added as a hydrophilisation agent. In a 250 ml three-neck flask equipped with a Dean-Stark water trap and a condenser, 6.4 g ethyl cellulose N-50 (Hercules) is dissolved in 160 ml toluene and heated to 85° C. Under 500 rpm stirring with a two-blade swing-out impeller, the hot agarose/tricalcium phosphate dispersion is slowly poured into the toluene phase and the system is emulsified at 500 rpm stirring for 30 min. Then the stirrer rate is lowered to 250 rpm and the heating bath temperature was increased to 120° C. to start the distillation of the water. When 50 ml water has been distilled off (giving a tricalcium phosphate concentration of 11 vol %), the heating bath is replaced with an ice bath to cause gelation of the agarose. The content of the flask is mixed with 50 ml water and centrifuged. The toluene phase is decanted and the bead slurry is washed twice with toluene and once with ethanol. The spherical beads are then leached with acetic acid over night to dissolve the tricalcium phosphate.

Example 6

Agarose Beads with Cylindrical Pores Templated by Calcium Carbonate Needles

Calcium carbonate (aragonite) needles of about 50 micron length and 5 micron width were prepared according to Wang et al: J Coll Interf Sci 218, 545–553 (1999) by precipitation from hot solutions of urea+calcium chloride. 0.8 g of these needles were mixed into a hot solution of 0.8 g agarose in 80 ml water. In a 250 ml three-neck flask equipped with a Dean-Stark water trap and a condenser, 3.2 g ethyl cellulose N-50 (Hercules) was dissolved in 160 ml toluene and heated to 85° C. Under 500 rpm stirring with a two-blade swing-out impeller, the hot agarose/calcium carbonate dispersion was slowly poured into the toluene phase and the system was emulsified at 500 rpm stirring for 30 min. Then the stirrer rate was lowered to 250 rpm and the heating bath temperature was increased to 120° C. to start the distillation of the water. When 60 ml water had been distilled off, the heating bath was replaced with an ice bath to cause gelation of the agarose. The content of the flask was mixed with 50 ml water and centrifuged. The toluene phase was decanted and the bead slurry was washed twice with toluene and once with ethanol. When studied in the light microscope, a significant amount of the agarose beads contained one or two calcium carbonate needles with both ends protruding outside the bead (FIG. 6). The needles were dissolved by leaching in acetic acid over night, resulting in open channels through the beads.

Example 7

Porous Poly-divinylbenzene Beads with Cylindrical Pores Templated by Glass Fibres A tuft of glass wool with 10 micron fibre diameter was immersed in a solution of dimethyldichlorosilane in trichloroethylene. After 1 h, the wool was washed twice with chloroform and once with toluene. It was then dried for 2 h at 60° C. The glass wool was cut to short pieces with scissors and then ground to a powder in a porcelain mortar. 0.7 g of this powder was mixed into a solution of 5 ml 63% divinylbenzene, 5 ml ethylhexanol and 100 mg azobisdimethylvaleronitrile. In a 100 ml three-necked flask, 100 ml 5% aqueous polyvinyl alcohol (Mowiol 40–88 from Clariant) solution was heated to 70° C. Under 350 rpm stirring with a two-blade swing-out impeller, the monomer/glass fibre dispersion was slowly poured into the aqueous phase. The emulsion was allowed to polymerise under 350 rpm stirring at 70° C. over night. The beads were collected on a 53 micron sieve and washed with acetone. As shown in FIG. 7a, the beads contained 1–2 glass fibres with both ends protruding through the surface. The beads were then treated with hydrofluoric acid over night to dissolve the fibres. As FIG. 7b shows, they then had cylindrical channels penetrating straight through the beads.

What is claimed is:
1. A method of producing at least one porous bead, which comprises the steps of
   (a) providing a first liquid phase comprising a bead matrix material and at least one essentially edgy templating particle, said particle(s) being treated with a surface modifying agent;
   (b) providing a second liquid phase which is immiscible with the first liquid phase;
   (c) contacting the first phase and the second phase under conditions resulting in an emulsion of droplets comprised of the first liquid phase dispersed in the continuous second liquid phase;
   (d) transforming the droplets to mesoporous beads by solidification of the liquid in said droplets; and
   (e) removing the templating particle(s) from the beads without causing any essential change of the surrounding bead, whereby the mesoporous beads resulting from step (d) are supplemented with one or more larger pores corresponding to the cavities left by the removed templating particle(s);
   whereby an essentially hierarchical network of pores is provided in each bead.
2. The method of claim 1, wherein a surface modifying agent is present in the first liquid phase when the templating particle(s) are added therein.
3. The method of claim 1, wherein the templating particle(s) are treated with a surface modifying agent before they are added to the first liquid phase.
4. The method of claim 1, which further comprises a step of diluting the droplet phase before step (c).
5. The method of claim 1, which further comprises a step of removing liquid from the droplet phase after step (c) but before step (d).
6. The method of claim 1, wherein the concentration of the templating particle(s) in the droplet phase is close to the percolation threshold during the solidification.
7. The method of claim 1, wherein the shape of the templating particle(s) is elongate and defined by an aspect ratio higher than two.

8. The method of claim 1, wherein the shape of the templating particle(s) is edgy and defined by a sphericity lower than about 0.8.

9. The method of claim 1, wherein the shape of the templating particle(s) is edgy and defined by a circularity of the particle projection(s) lower than about 0.85.

10. The method of claim 1, wherein the templating particle(s) are acid-soluble and made from a material selected from the group consisting of carbonate minerals, oxide minerals, calcium phosphate, magnesium hydroxide, and metals.

11. The method of claim 10, wherein the templating particles are removed by leaching with an acid.

12. The method of claim 1, wherein the templating particle(s) are siliceous particles and made from a material selected from the group consisting of silica, diatomite, glass, and silicate minerals.

13. The method of claim 12, wherein the templating particles are removed by leaching with a fluorine compound.

14. The method of claim 1, wherein the templating particle(s) are organic or carbonaceous particles and made from a material selected from the group consisting of organic polymers, low molecular weight organic crystals and carbon.

15. The method of claim 1, wherein the templating particle(s) are alkali-soluble particles and made from a material selected from the group consisting of siliceous particles, metal particles and oxides.

16. The method of claim 14, wherein the templating particles are removed by leaching with a base.

17. The method of claim 1, wherein the templating particles are volatilised by heat treatment, optionally in the presence of air or oxygen.

18. The method of claim 1, wherein the droplet phase of the emulsion is comprised of oil droplets.

19. The method of claim 18, wherein the bead matrix material is comprised of synthetic monomers and the transformation according to step (d) is a polymerisation in the presence of a porogen and a cross-linker.

20. The method of claim 1, wherein the droplet phase of the emulsion is comprised of aqueous droplets.

21. The method of claim 20, wherein the bead matrix material is comprised of a natural polymer and the transformation according to step (d) is a physical gelation.

22. The method of claim 20, wherein the aqueous droplets comprise an inorganic compound and the transformation according to step (d) is a sol-gel precipitation.

* * * * *